United States Patent
Park et al.

(10) Patent No.: US 11,486,019 B2
(45) Date of Patent: Nov. 1, 2022

(54) NON-ORIENTED ELECTRICAL STEEL SHEET AND MANUFACTURING METHOD THEREFOR

(71) Applicant: POSCO, Pohang-si (KR)

(72) Inventors: June Soo Park, Pohang-si (KR); Dae-Hyun Song, Pohang-si (KR)

(73) Assignee: POSCO, Pohang-si (KR)

( * ) Notice: Subject to any disclaimer, the term of this patent is extended or adjusted under 35 U.S.C. 154(b) by 118 days.

(21) Appl. No.: 16/958,266

(22) PCT Filed: Dec. 18, 2018

(86) PCT No.: PCT/KR2018/016138
§ 371 (c)(1),
(2) Date: Jun. 26, 2020

(87) PCT Pub. No.: WO2019/132377
PCT Pub. Date: Jul. 4, 2019

(65) Prior Publication Data
US 2020/0332388 A1 Oct. 22, 2020

(30) Foreign Application Priority Data
Dec. 26, 2017 (KR) .................. 10-2017-0179609

(51) Int. Cl.
| | | |
|---|---|---|
| C21D 9/46 | (2006.01) | |
| C21D 6/00 | (2006.01) | |
| C21D 8/00 | (2006.01) | |
| C21D 8/12 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/14 | (2006.01) | |
| C22C 38/60 | (2006.01) | |

(52) U.S. Cl.
CPC .............. *C21D 9/46* (2013.01); *C21D 6/005* (2013.01); *C21D 6/008* (2013.01); *C21D 8/005* (2013.01); *C21D 8/1222* (2013.01); *C21D 8/1233* (2013.01); *C21D 8/1272* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/14* (2013.01); *C22C 38/60* (2013.01); *C22C 2202/02* (2013.01)

(58) Field of Classification Search
CPC .......... C21D 1/26; C21D 6/005; C21D 6/008; C21D 8/005; C21D 8/1222; C21D 8/1233; C21D 8/1244; C21D 8/1261; C21D 8/1272; C21D 9/46; C22C 2202/02; C22C 38/001; C22C 38/002; C22C 38/008; C22C 38/02; C22C 38/04; C22C 38/06; C22C 38/14; C22C 38/60; Y02P 10/20
See application file for complete search history.

(56) References Cited

U.S. PATENT DOCUMENTS
2008/0121314 A1 5/2008 Choi et al.

FOREIGN PATENT DOCUMENTS
| CN | 104674136 A | 6/2015 |
|---|---|---|
| CN | 111527218 B | 3/2022 |
| EP | 2657355 B1 | 9/2015 |
| EP | 2612933 B1 | 2/2020 |
| JP | H06-073511 A | 3/1994 |
| JP | 2005-120403 A | 5/2005 |
| JP | 2006-249555 A | 9/2006 |
| JP | 2006-265720 A | 10/2006 |

(Continued)

OTHER PUBLICATIONS

Extended European Search Report dated Feb. 17, 2021 issued in European Patent Application No. 18896282.3.
International Search Report dated Mar. 19, 2019 issued in International Patent Application No. PCT/KR2018/016138 (with English translation).
Chinese Office Action dated Jun. 1, 2021, issued in corresponding Chinese Patent Application No. 201880084901.X.
Japanese Office Action dated Aug. 3, 2021 issued in Japanese Patent Application No. 2020-536075.

*Primary Examiner* — Jenny R Wu
(74) *Attorney, Agent, or Firm* — Morgan, Lewis & Bockius LLP

(57) ABSTRACT

The present invention relates to a non-oriented electrical steel sheet including 1.5 to 4.0 wt % of Si, 0.1 to 1.5 wt % of Al, 0.1 to 1.5 wt % of Mn, 0.005 wt % or less (excluding 0%) of C, 0.005 wt % or less (excluding 0%) of N, 0.005 wt % or less (excluding 0%) of Ti, 0.001 to 0.005 wt % of S, 0.1 wt % or less (excluding 0%) of P, 0.02 to 0.2 wt % of at least one of Sn and Sb, and a balance of Fe and other inevitable impurities; and satisfying the following Formulas 1, 2, and 3.

$$0.9 \leq [Al]+[Mn] \leq 2.1 \quad \text{[Formula 1]}$$

$$0.2 \leq ([Si]+[Al]+[Mn]/2)*([P]+[Sn]+[Sb]) \leq 0.4 \quad \text{[Formula 2]}$$

$$(Gs_{center}-Gs_{surface})/(Gs_{center}*t) \leq 0.5 \quad \text{[Formula 3]}$$

(In Formula 1 and Formula 2, [Al], [Mn], [Si], [P], [Sn], and [Sb] represent the content (weight %) of Al, Mn, Si, P, Sn, and Sb, respectively, and in Formula 3, t represents the thickness (mm) of the non-oriented electrical steel sheet, $Gs_{surface}$ represents the average grain size (μm) from 0 to t/4 or 3t/4 to t based on the thickness direction of the non-oriented steel sheet, $Gs_{center}$ represents the average grain size (μm) from more than t/4 to less than 3t/4 based on the thickness direction of the non-oriented steel sheet.)

6 Claims, No Drawings

(56) References Cited

FOREIGN PATENT DOCUMENTS

| | | | |
|---|---|---|---|
| JP | 2007-177282 A | 7/2007 | |
| JP | 2008-127612 A | 6/2008 | |
| JP | 2009-102739 A | 5/2009 | |
| JP | 2011-132558 A | 7/2011 | |
| JP | 2012-036454 A | 2/2012 | |
| JP | 2012-046806 A | 3/2012 | |
| JP | 2012-132070 A | 7/2012 | |
| JP | 2014-003983 A | 1/2014 | |
| KR | 970043173 A | 7/1997 | |
| KR | 970053173 A | 7/1997 | |
| KR | 10-1089302 B1 | 12/2011 | |
| KR | 10-2012-046806 A | 3/2012 | |
| KR | 10-1119960 B1 | 3/2012 | |
| KR | 10-2013-0032913 A | 4/2013 | |
| KR | 2013076640 A * | 7/2013 | ........... C21D 8/1222 |
| KR | 10-2013-0101092 A | 9/2013 | |
| KR | 10-2014-0133100 A | 11/2014 | |
| KR | 10-2015-0075250 A | 7/2015 | |
| KR | 10-2015-0075255 A | 7/2015 | |
| KR | 20150075250 A * | 7/2015 | |
| KR | 10-2016-0073222 A | 6/2016 | |
| KR | 10-2016-0075262 A | 6/2016 | |
| KR | 10-2016-0078175 A | 7/2016 | |
| KR | 10-1728827 B1 | 4/2017 | |
| WO | 2017/086036 A1 | 5/2017 | |

\* cited by examiner

NON-ORIENTED ELECTRICAL STEEL SHEET AND MANUFACTURING METHOD THEREFOR

CROSS-REFERENCE TO RELATED APPLICATION

This application is the U.S. National Phase under 35 U.S.C. § 371 of International Patent Application No. PCT/KR2018/016138, filed on Dec. 18, 2018, which in turn claims priority to and the benefit of Korean Application No. 10-2017-0179609, filed in the Korean Intellectual Property Office on Dec. 26, 2017, the entire disclosures of which are incorporated herein by reference.

BACKGROUND OF THE INVENTION

(a) Field of the Invention

The present invention relates to a non-oriented electrical steel sheet and a method for manufacturing the same.

(b) Description of the Related Art

A non-oriented electrical steel sheet is used as a material for iron cores in rotating devices such as motors and generators as well as in electrical devices such as small transformers, and plays an important role in converting mechanical energy into electrical energy or electrical energy into mechanical energy, or converting electrical energy into another type of electrical energy. The non-oriented electrical steel sheet is a very important material for determining the energy efficiency of electrical devices in the energy conversion system. Accordingly, in order to conserve and save energy, the development of a non-oriented electrical steel sheet having superior properties, particularly excellent iron loss, has been continuously required, and attempts to continuously improve properties will be made in the future.

The representing magnetic characteristics of non-oriented electrical steel sheet are iron loss and magnetic flux density. Iron loss is related to energy loss during use of an electric device, and magnetic flux density is related to torque of an electric device. For high efficiency characteristics required for electric motors and generators, low iron loss characteristics are very important, and thus, non-oriented electrical steel sheets having lower iron loss have been required. An effective method for lowering the iron loss is to increase the addition amount of Si or to reduce the thickness of the steel sheet, wherein Si is an essential alloy element which is importantly added to non-oriented electrical steel sheets, and has high specific resistance. In electrical steel sheets, iron loss may be divided into hysteresis loss and eddy current loss. These methods are very effective in reducing the eddy current loss.

However, a thin steel sheet has a disadvantage in that its workability is poor and its processing cost increases. Thus, in high-end products, the addition amount of Si, Al, and Mn have been increased in order to further reduce iron loss by increasing specific resistance. However, the increase in the amount of Si, Al, and Mn does not necessarily reduce iron loss, so it must be controlled in an optimal combination. In addition, since iron loss cannot be drastically reduced by only controlling Si, Al, and Mn, it may be said that finding a technique capable of dramatically improving the iron loss is not an easy task.

On the other hand, since non-oriented electrical steel sheets used in motors or generators are used as iron core materials of rotating electrical devices, it is preferable to have uniform properties in all directions, unlike grain-oriented electrical steel sheets in which only the characteristic in one rolling direction is important. Thus, non-oriented electrical steel sheets with a small deviation in iron loss between the rolling direction and the perpendicular rolling direction are preferred, but non-oriented electrical steel sheets produced by commercial methods have some degree of iron loss deviation, and finding a method of reducing the deviation is still not easy.

Therefore, in order to improve iron loss, a method for improving magnetic properties by improving an aggregation structure by utilizing special additive elements such as REM has been attempted. However, although these methods have been developed to improve iron loss, they cause a rise in manufacturing cost and difficulty in mass production, so that there is a need for development of a method that has an excellent iron loss property and is easy to use for commercial production.

SUMMARY OF THE INVENTION

An exemplary embodiment of the present invention provides a non-oriented electrical steel sheet having improved magnetic properties and an improved aggregation structure and a method for manufacturing the same by controlling the components through the relational formulas of amounts of Si, Al, Mn, P, Sn, and Sb, and controlling the process conditions through a ratio of an average heating rate and a soaking time at a soaking temperature in the method for manufacturing.

An exemplary embodiment of the present invention includes 1.5 to 4.0 wt % of Si, 0.1 to 1.5 wt % of Al, 0.1 to 1.5 wt % of Mn, 0.005 wt % or less (excluding 0%) of C, 0.005 wt % or less (excluding 0%) of N, 0.005 wt % or less (excluding 0%) of Ti, 0.001 to 0.005 wt % of S, 0.1 wt % or less (excluding 0%) of P, 0.02 to 0.2 wt % of at least one of Sn and Sb, and a balance of Fe and other inevitable impurities, and satisfies the following Formulas 1, 2, and 3.

$$0.9 \leq [Al]+[Mn] \leq 2.1 \quad \text{[Formula 1]}$$

$$0.2 \leq ([Si]+[Al]+[Mn]/2)*([P]+[Sn]+[Sb]) \leq 0.4 \quad \text{[Formula 2]}$$

$$(Gs_{center}-Gs_{surface})/(Gs_{center}*t) \leq 0.5 \quad \text{[Formula 3]}$$

(In Formula 1 and Formula 2, [Al], [Mn], [Si], [P], [Sn], and [Sb] represent the content (weight %) of Al, Mn, Si, P, Sn, and Sb, respectively, and in Formula 3, t represents the thickness (mm) of the non-oriented electrical steel sheet, $Gs_{surface}$ represents the average grain size (μm) from 0 to t/4 or 3t/4 to t based on the thickness direction of the non-oriented steel sheet, and $Gs_{center}$ represents the average grain size (μm) from more than t/4 to less than 3t/4 based on the thickness direction of the non-oriented steel sheet.)

The non-oriented electrical steel sheet may further include at least one of 0.05 wt % or less (excluding 0%) of Cu, 0.05 wt % or less (excluding 0%) of Ni, 0.05 wt % or less (excluding 0%) of Cr, 0.01 wt % or less (excluding 0%) of Zr, 0.01 wt % or less (excluding 0%) of Mo, and 0.01 wt % or less (excluding 0%) of V.

The non-oriented electrical steel sheet may satisfy the following Formula 4.

$$0.2 \leq (V_{\{012\}<121>}+V_{\{111\}<112>})/(V_{\{001\}<310>}+V_{\{139\}<310>}) \leq 0.8 \quad \text{[Formula 4]}$$

(In Formula 4, $V_{\{012\}<121>}$, $V_{\{111\}<112>}$, $V_{\{001\}<310>}$, and $V_{\{139\}<310>}$ represent the volume fraction of an aggregation structure having an orientation within 15° at {012}<121>, {111}<112>, {001}<310>, and {139}<310>, respectively.)

An exemplary embodiment of the present invention provides a method for manufacturing a non-oriented electrical steel sheet including: heating a slab including 1.5 to 4.0 wt % of Si, 0.1 to 1.5 wt % of Al, 0.1 to 1.5 wt % of Mn, 0.005 wt % or less (excluding 0%) of C, 0.005 wt % or less (excluding 0%) of N, 0.005 wt % or less (excluding 0%) of Ti, 0.001 to 0.005 wt % of S, 0.1 wt % or less (excluding 0%) of P, 0.02 to 0.2 wt % of at least one of Sn and Sb, and a balance of Fe and other inevitable impurities, and satisfying Formula 1 and Formula 2; producing a hot-rolled sheet by hot rolling the slab; producing a cold-rolled sheet by cold rolling the hot-rolled sheet; and performing cold rolled sheet annealing to satisfy the following Formula 5.

$$0.9 \leq [Al]+[Mn] \leq 2.1 \quad \text{[Formula 1]}$$

$$0.2 \leq ([Si]+[Al]+[Mn]/2)*([P]+[Sn]+[Sb]) \leq 0.4 \quad \text{[Formula 2]}$$

$$0.2 \leq v/s \leq 0.6 \quad \text{[Formula 5]}$$

(In Formula 1 and Formula 2, [Al], [Mn], [Si], [P], [Sn], and [Sb] represent the content (weight %) of Al, Mn, Si, P, Sn, and Sb, respectively, and in Formula 5, v represents an average heating rate (° C./sec) from a starting temperature of 650 to 750° C. to a soaking temperature of the cold rolled sheet, and s represents the soaking time (sec) maintained at the soaking temperature of the cold-rolled sheet.)

The slab thereof may further include at least one of 0.05 wt % or less (excluding 0%) of Cu, 0.05 wt % or less (excluding 0%) of Ni, 0.05 wt % or less (excluding 0%) of Cr, 0.01 wt % or less (excluding 0%) of Zr, 0.01 wt % or less (excluding 0%) of Mo, and 0.01 wt % or less (excluding 0%) of V.

In the performing cold rolled sheet annealing, the soaking temperature may be 850 to 1050° C.

After producing a hot-rolled sheet by hot rolling the slab, the method further includes performing the hot-rolled sheet annealing at 950 to 1150° C.

The non-oriented electrical steel sheet and the method for manufacturing the same according to an embodiment of the present invention may be expected to improve the magnetic properties by controlling the component through formulas of content of Si, Al, Mn, P, Sn, and Sb, and controlling the process conditions through the ratio of the average heating rate and the soaking time at a soaking temperature in the method for manufacturing.

In addition, it is possible to expect an effect of improving the aggregation structure favorable to magnetic properties and an effect of less deviation in the average grain size between the surface portion and the center portion based on the thickness direction.

DETAILED DESCRIPTION OF THE EMBODIMENTS

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Thus, a first component, constituent element, or section described below may be referred to as a second component, constituent element, or section, without departing from the range of the present invention.

The terminologies used herein are used just to illustrate a specific exemplary embodiment, but are not intended to limit the present invention. It must be noted that, as used in the specification and the appended claims, singular forms used herein include plural forms unless the context clearly dictates the contrary. It will be further understood that the term "comprises" or "includes", used in this specification, specifies stated properties, regions, integers, steps, operations, elements, and/or components, but does not preclude the presence or addition of other properties, regions, integers, steps, operations, elements, components, and/or groups.

When referring to a part as being "on" or "above" another part, it may be positioned directly on or above another part, or another part may be interposed therebetween. In contrast, when referring to a part being "directly above" another part, no other part is interposed therebetween.

Unless defined otherwise, all terms including technical and scientific terms used herein have the same meaning as commonly understood by one of ordinary skill in the art to which the present invention belongs. Terms defined in a commonly used dictionary are further interpreted as having a meaning consistent with the relevant technical literature and the present disclosure, and are not to be construed as idealized or very formal meanings unless defined otherwise.

Unless otherwise stated, % means % by weight, and 1 ppm is 0.0001% by weight.

In an exemplary embodiment of the present invention, the meaning of further comprising/including an additional element implies replacing remaining iron (Fe) by an additional amount of the additional element.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Non-Oriented Electrical Steel Sheet

In an exemplary embodiment of the present invention, the magnetic properties are significantly improved by optimizing the range of Si, Al, and Mn which are additive components in the non-oriented electrical steel sheet, and simultaneously controlling the grain boundary segregation elements such as P, Sn, and Sb.

A non-oriented electrical steel sheet of an exemplary embodiment in the present invention includes 1.5 to 4.0 wt % of Si, 0.1 to 1.5 wt % of Al, 0.1 to 1.5 wt % of Mn, 0.005 wt % or less (excluding 0%) of C, 0.005 wt % or less (excluding 0%) of N, 0.005 wt % or less (excluding 0%) of Ti, 0.001 to 0.005 wt % of S, 0.1 wt % or less (excluding 0%) of P, 0.02 to 0.2 wt % of at least one of Sn and Sb, and a balance of Fe and other inevitable impurities.

The reasons for component limitation of the non-oriented electric steel sheet of the present invention are as follows.

Si: 2.0 to 4.0 wt %

Silicon (Si) is an element added to reduce eddy current loss during iron loss by increasing specific resistance of the steel, and when too little is added, the iron loss improvement effect may be insufficient. Conversely, when too much is added, the magnetic flux density may be reduced and a rolling property may be poor. Thus, Si may be added in the above-described range.

Al: 0.1 to 1.5 wt %

Aluminum (Al), like Si, plays a role in reducing the iron loss by increasing the specific resistance, and Al is an element that reduces magnetic deviation between the rolling direction and the rolling vertical direction by reducing magnetic anisotropy. When too little is added, Al forms a fine nitride and may increase the iron loss deviation between the rolling direction and the rolling vertical direction. However, when too much is added, the nitride is excessively formed, and thus the magnetic flux density may be greatly reduced. Thus, Al may be added in the above-described range.

Mn: 0.1 to 1.5 wt %

Manganese (Mn) is added to reduce the iron loss by increasing specific resistance, and there is an effect of improving the aggregation structure. When too little is added, the effect of improving iron loss may be insufficient. However, when too much is added, MnS is excessively precipitated, and the magnetic flux density may be greatly reduced. Thus, Mn may be added in the above-described range.

C: 0.005 wt % or less

Carbon (C) is combined with Ti to form a carbide, so when too much is added, the magnetism may be reduced, and it increases the iron loss due to magnetic aging when it used after an electrical product is processed. Thus, C may be added in the above-described range.

N: 0.005 wt % or less

Nitrogen (N) is strongly combined with Al, Ti, etc., to form a nitride, so when too much is added, it is harmful to the magnetism by suppressing crystal grain growth. Thus, N may be added in the above-described range.

Ti: 0.005 wt % or less

Titanium (Ti) is combined with C and N to form a carbide and a nitride, so when too much is added, it is harmful to the magnetism by suppressing crystal grain growth, and making a poor aggregation structure due to the increased carbide and nitride. Thus, Ti may be added in the above-described range.

S: 0.001 to 0.005 wt %

Sulfur (S) is an element which forms sulfides such as MnS, CuS, (Cu, Mn)S, etc., which are harmful to the magnetic properties. When too little is added, the magnetism may be deteriorated due to the disadvantage of forming the aggregation structure. However, when too much is added, the magnetism may be reduced due to the increase of fine sulfides. Thus, S may be added in the above-described range.

P: 0.1 wt % or less

Phosphorus (P) is an element which lowers the iron loss by increasing the specific resistance and improves the aggregation structure by segregating in the grain boundary. When too much is added, it suppresses grain growth and degrades cold rolling property. Thus, P may be added in the above-described range.

At least one of Sn, Sb: 0.02 to 0.2 wt %

Tin (Sn) and antimony (Sb) are grain boundary segregation elements, and suppress the diffusion of nitrogen through the grain boundaries, and the formation of gamma fiber which is an aggregation structure, to improve the magnetic properties. When too little is added, the effect of improving magnetic properties is slight, and when too much is added, grain growth may be suppressed to degrade magnetism, and rolling properties and surface quality are reduced. Thus, at least one of Sn and Sb may be added in the above-described range. When Sn or Sb is included alone, 0.02 to 0.2 wt % of Sn may be included, and 0.02 to 0.2 wt % of Sb may be included. When both Sn and Sb are included together, 0.02 to 0.2 wt % of sum of Sn and Sb may be included.

Impurity Elements

In addition to the above-described elements, inevitably incorporated impurities such as Cu, Ni, Cr, Zr, Mo, and V may be included. In case of Cu, Ni, or Cr, it reacts with impurity elements to from fine sulfides, carbides, and nitrides, which have a harmful effect on the magnetism. And in case of Zr, Mo, or V, they are also strong carbonitride forming elements. Thus, they should be controlled to 0.05 wt % or less of Cu, 0.05 wt % or less of Ni, 0.05 wt % or less of Cr, 0.01 wt % or less of Zr, 0.01 wt % or less of Mo, and 0.01 wt % or less of V.

In addition to the above composition, the balance is Fe and other inevitable impurities.

A non-oriented electrical steel sheet of an exemplary embodiment in the present invention satisfies following Formula 1.

$$0.9 \leq [Al]+[Mn] \leq 2.1 \quad \text{[Formula 1]}$$

(In Formula 1, [Al] and [Mn] represent the content (weight %) of Al and Mn, respectively.)

Al and Mn are both elements that increase the specific resistance and lower iron loss. Accordingly, the content of Al and Mn may be managed by there sum. In general, in order to manufacture a non-oriented electrical steel sheet having low iron loss and high magnetic flux density, it is necessary to add Si, Al, and Mn in an appropriate amount or more. However, when [Al]+[Mn] is added at less than 0.9 wt %, the content of Si becomes relatively high, which can be a fatal problem in that the productivity is reduced by lowering the rolling property. On the other hand, when [Al]+[Mn] exceeds 2.1 wt %, the magnetic flux density may rapidly decrease as the saturation magnetic flux density decreases.

A non-oriented electrical steel sheet of an exemplary embodiment in the present invention satisfies following Formula 2.

$$0.2 \leq ([Si]+[Al]+[Mn]/2)*([P]+[Sn]+[Sb]) \leq 0.4 \quad \text{[Formula 2]}$$

(In Formula 2, [Al], [Mn], [Si], [P], [Sn], and [Sb] represent the content (weight %) of Al, Mn, Si, P, Sn, and Sb, respectively.)

Si, Al, and Mn are alloy elements added to reduce iron loss of the non-oriented electrical steel sheet, and should be added at a certain amount or more for low iron properties. However, as the magnetic properties of non-oriented electrical steel sheet, high magnetic flux density is also as important as low iron loss.

Low iron loss may be achieved due to the addition of Si, Al, and Mn, but the magnetic flux density decreases; accordingly, it is difficult to achieve a high magnetic flux density property. Thus it is necessary to simultaneously improve the iron loss and the magnetic flux density by improving the aggregation structure.

Therefore, according to Formula 2, P, Sn, and Sb which improve the aggregation structure as grain boundary segregation elements are added, but the content of P, Sn, and Sb should be considered together with the content of Si, Al, and Mn which are elements related to magnetic flux density. Through this, it is possible to simultaneously achieve a low iron loss property and a high magnetic flux density property.

When $([Si]+[Al]+[Mn]/2)*([P]+[Sn]+[Sb])$ is less than 0.2, the contents of P, Sn, and Sb are relatively small, and the effect of improving the aggregation structure is not large, so it may be difficult to achieve the high magnetic flux density property.

However, when $([Si]+[Al]+[Mn]/2)*([P]+[Sn]+[Sb])$ is more than 0.4, contents of P, Sn, and Sb are relatively large, and since grain growth is excessively inhibited, crystal grains are refined. Accordingly, it may be difficult to achieve the low iron loss property.

A non-oriented electrical steel sheet of an exemplary embodiment in the present invention satisfies following Formula 3.

$$(Gs_{center} - Gs_{surface})/(Gs_{center} * t) \leq 0.5 \text{ (mm}^{-1}) \quad \text{[Formula 3]}$$

(In Formula 3, t represents the thickness (mm) of the non-oriented electrical steel sheet, $Gs_{surface}$ represents the average grain size (μm) from 0 to t/4 or 3t/4 to t based on the thickness direction of the non-oriented steel sheet, and $Gs_{center}$ represents the average grain size (μm) from more than t/4 to less than 3t/4 based on the thickness direction of the non-oriented steel sheet.)

For example, when the thickness of non-oriented electrical steel sheet refers to as t, $Gs_{surface}$ represents the crystal grain size existing from the bottom surface to t/4 of a non-oriented electrical steel sheet, or the crystal grain size existing from 3t/4 to the top surface of a non-oriented electrical steel sheet. That is, $Gs_{surface}$ may mean the average crystal grain size of a surface portion of a non-oriented electrical steel sheet. $Gs_{center}$ represents the crystal grain size existing in a range of greater than t/4 and less than 3t/4. Than is, $Gs_{center}$ may mean the average crystal grain size of a central portion of a non-oriented electrical steel sheet.

The lower the value of $(Gs_{center} - Gs_{surface})/(Gs_{center} * t)$, the smaller the deviation between $Gs_{center}$ and $Gs_{surface}$, thus it may mean that the crystal grain size of the surface portion and the center portion is uniform in the thickness direction of the steel sheet.

For iron loss, the sum of hysteresis loss and eddy current loss is the smallest at the optimum grain size. Even if the average crystal grain size is the same, when the crystal grain size deviation in the thickness direction is large, the iron loss increases compared to the case where the crystal grain size deviation is small and uniform.

In order to satisfy $(Gs_{center} - Gs_{surface})/(Gs_{center} * t) \leq 0.5$ (mm$^{-1}$), when performing cold rolled sheet annealing in the method for manufacturing a non-oriented electrical steel sheet, the aggregation structure may be further improved by controlling the heating rate and soaking time. This will be described later.

A non-oriented electrical steel sheet of an exemplary embodiment in the present invention satisfies the following Formula 4.

$$0.2 \leq (V_{\{012\}<121>} + V_{\{111\}<112>})/(V_{\{001\}<310>} + V_{\{139\}<310>}) \leq 0.8 \quad \text{[Formula 4]}$$

(In Formula 4, $V_{\{012\}<121>}$, $V_{\{111\}<112>}$, $V_{\{001\}<310>}$, and $V_{\{139\}<310>}$ represent the volume fraction of an aggregation structure having an orientation within 15° at {012}<121>, {111}<112>, {001}<310>, and {139}<310>, respectively.)

Aggregation structures {012}<121>and {111}<112>are difficult to magnetize, so they are unfavorable to magnetism. {001}<310>and {139}<310> are parts of <100>//ND-fiber or similar orientations to <100>//ND-fiber, respectively, so they are favorable to magnetism. Therefore, a lower value of (V{012}<121>+V{111}<112>)/(V{001}<310>+V{139}<310>) means that the aggregation structures are improved.

It is possible to increase the proportions of aggregation structures {001}<310> and {139}<310>, which are favorable for magnetism, by controlling the content of components. When (V{012}<121>+V{111}<112>)/(V{01}<310>+V{139}<310>) is less than 0.2, the aggregation structure improvement effect is not large, and when it is more than 0.8, it can be said that the aggregation structure is inferior and there is no improvement effect.

Method for Manufacturing a Non-Oriented Electrical Steel Sheet

A method for manufacturing a non-oriented electrical steel sheet, includes: heating a slab including 1.5 to 4.0 wt % of Si, 0.1 to 1.5 wt % of Al, 0.1 to 1.5 wt % of Mn, 0.005 wt % or less (excluding 0%) of C, 0.005 wt % or less (excluding 0%) of N, 0.005 wt % or less (excluding 0%) of Ti, 0.001 to 0.005 wt % of S, 0.1 wt % or less (excluding 0%) of P, 0.02 to 0.2 wt % of at least one of Sn and Sb, and a balance of Fe and other inevitable impurities, and satisfying Formula 1 and Formula 2; producing a hot-rolled sheet by hot rolling the slab; producing a cold-rolled sheet by cold rolling the hot-rolled sheet; and performing cold-rolled sheet annealing to satisfy following Formula 5.

Hereinafter, each step is described in detail.

First, the slab is heated. The reason for limiting the addition ratio of each composition in the slab is the same as the reason for the composition limitation of the non-oriented electrical steel sheet described above, and therefore the repeated description is omitted. In the manufacturing process of the hot rolling, the hot-rolled sheet annealing, the cold rolling, the cold-rolled sheet annealing, and the like to be described later, since the composition of the slab is not substantially changed, the composition of the slab and the composition of the non-oriented electrical steel sheet are substantially the same.

In addition, since the composition in the slab and the composition of the the non-oriented electrical steel sheet are substantially the same, the slab satisfies Formulas 1 and 2 described above. The effect of satisfying Formulas 1 and 2 is replaced by the above description.

The slab is charged into a heating furnace and heated at 1200° C. or less. When being heated at a temperature exceeding 1200° C., precipitates such as AlN, MnS, etc. existing in the slab are re-dissolved and then minutely precipitated during the hot rolling, thereby suppressing the crystal grain growth and deteriorating the magnetism. Thus, the slab heating temperature is limited to 1200° C. or less.

The heated slab is hot-rolled to manufacture a hot-rolled sheet. The finishing rolling in finishing milling step during the hot rolling may be performed with a final reduction ratio of 20% or less for correction of a plate profile. The heat rolled sheet is spiral-wound at 700° C. or less and cooled in air.

Next, the hot-rolled sheet may undergo hot-rolled sheet annealing. At this time, the hot-rolled sheet annealing temperature may be 950 to 1150° C. If the hot-rolled sheet annealing temperature is less than 950° C., the crystal grains do not grow or grow finely, making it difficult to obtain an aggregation structure favorable to magnetism. When the annealing temperature exceeds 1150° C., crystal grains grow excessively and surface defects on the plate may become excessive.

Next, the hot-rolled sheet is pickled and cold rolled to have a predetermined plate thickness. The cold-rolled sheet may be manufactured by cold rolling so as to have a final thickness of 0.10 to 0.70 mm. If necessary, in order to improve magnetism, after primary cold rolling and intermediate annealing, secondary cold rolling may be performed, and the final rolling reduction may be in the range of 50 to 95%.

In the step of performing cold-rolled sheet annealing, the cold-rolled sheet is annealed to satisfy Formula 5 below.

$$0.2 \leq v/s \leq 0.6 \quad \text{[Formula 5]}$$

(In Formula 5, v represents an average heating rate (° C./sec) from a starting temperature of 650 to 750° C. to a soaking temperature of the cold rolled sheet, and s represents the soaking time (sec) maintained at the soaking temperature of the cold-rolled sheet.)

An important metallurgical change that determines microstructure and aggregation-structure changes that occur during cold-rolled annealing is recrystallization and crystal grain growth. When annealing a structure deformed by cold rolling, factors that significantly affect recrystallization and crystal grain growth include average heating rate, soaking temperature, and soaking time at soaking temperature.

In the non-oriented electrical steel sheet, there is an appropriate crystal grain size that minimizes iron loss. This is because, as the crystal grain size increases, the hysteresis loss among iron loss decreases but the eddy current loss increases.

Therefore, the average grain size of the entire non-oriented electrical steel sheet is also important, but since it is used as an iron core material for rotating electrical devices, the iron loss must have uniform properties in all directions, and accordingly the grain size uniformity to the thickness direction of the steel sheet is also a very important factor to be controlled. When annealing the cold-rolled sheet, if the heating rate and soaking time at the soaking temperature are controlled under appropriate conditions, it is possible to secure grain size uniformity in the thickness direction. When annealing the cold-rolled sheet, the aggregation structure may also be greatly affected by the average heating rate and the soaking time at the soaking temperature. Therefore, if these two conditions are properly controlled, magnetism may be significantly improved.

When v/s is less than 0.2, the average heating rate is too slow or the soaking time is too long during annealing, so that the fraction of aggregation structure that is disadvantageous to magnetism may be increased.

When v/s exceeds 0.6, the heating rate is too fast or the soaking time is too short, so that the grain growth is not good, so the magnetism may be reduced due to grain refinement.

Therefore, when $0.2 \leq v/s \leq 0.6$ is satisfied, $(Gs_{center} - Gs_{surface})/(Gs_{center}*t)$ of the non-oriented electrical steel sheet may be 0.5 (mm$^{-1}$) or less.

The cold-rolled sheet that is finally cold rolled is subjected to the cold-rolled sheet annealing. When annealing the cold-rolled sheet, the soaking temperature may be 850 to 1050° C. If the soaking temperature is too low, the recrystallization does not occur sufficiently, and if the soaking temperature is too high, the rapid growth of the crystal grain may occur such that the magnetic flux density and the high-frequency iron loss may be deteriorated.

Hereinafter, the present invention is described in more detail through examples. However, these examples are merely to illustrate the present invention, and the present invention is not limited thereto.

EXAMPLES

Example 1

The purpose of this example is to observe the effect of the component elements, the relationship of content of added components, and the relationship between the average heating rate v(° C./sec) from 700° C. to the soaking temperature and the soaking time s (in seconds) at the soaking temperature during the cold-rolled sheet annealing by preparing a slab composed as shown in Table 1 through vacuum dissolution and changing the amount of Si, Mn, Al, P, Sn, and Sb.

Each slab was heated at 1200° C., hot rolled to a thickness of 2.5 mm, and then spiral-wound. The hot-rolled steel sheet was spiral-wound in the air and the cooled hot-rolled steel sheet was annealed at 1060° C. and pickled, and then the cooled hot-rolled steel sheet was cold rolled to a thickness of 0.35 mm, and finally cold-rolled sheet annealing was performed.

At this time, the target temperature of the cold-rolled sheet annealing was 1000° C., and the average heating rate v (° C./sec) from 700° C. to the soaking temperature and the soaking time s (in seconds) at the soaking temperature of 1000° C. were controlled, respectively, and the effect of v/s change on magnetism was confirmed.

For each sample, the volume fraction of the aggregation structure was measured by EBSD and an X-ray pole figure test, the grain size of the center portion and the surface portion in the sheet thickness direction was measured using the intercept method, and the iron loss ($W_{15150}$) and the magnetic flux density ($B_{50}$) were also measured. The results are shown in Table 2 below.

TABLE 1

| Steel type (wt %) | C | Si | Mn | P | S | Al | N | Ti | Sn | Sb |
|---|---|---|---|---|---|---|---|---|---|---|
| A1 | 0.001 | 2.51 | 0.28 | 0.02 | 0.0024 | 0.75 | 0.0011 | 0.0009 | 0.03 | 0.01 |
| A2 | 0.0025 | 3.29 | 0.86 | 0.03 | 0.0047 | 0.26 | 0.0021 | 0.0024 | 0.01 | 0.02 |
| A3 | 0.0012 | 2.95 | 0.65 | 0.04 | 0.0033 | 0.77 | 0.0019 | 0.0018 | 0.01 | 0 |
| A4 | 0.0033 | 3.07 | 0.86 | 0.03 | 0.0017 | 0.93 | 0.0029 | 0.0041 | 0.04 | 0.08 |
| A5 | 0.002 | 3.12 | 0.84 | 0.03 | 0.0038 | 0.67 | 0.0039 | 0.0011 | 0.04 | 0 |
| A6 | 0.0024 | 2.34 | 0.18 | 0.05 | 0.0035 | 1.64 | 0.0026 | 0.0022 | 0 | 0.04 |
| A7 | 0.0011 | 3.12 | 0.72 | 0.02 | 0.0023 | 1.34 | 0.0033 | 0.0034 | 0 | 0.03 |
| A8 | 0.0039 | 2.53 | 0.67 | 0.01 | 0.0019 | 1.29 | 0.0018 | 0.0032 | 0 | 0.05 |
| A9 | 0.0018 | 3.36 | 0.39 | 0.07 | 0.0019 | 0.54 | 0.0015 | 0.0021 | 0.03 | 0 |
| A10 | 0.0021 | 2.96 | 0.42 | 0.05 | 0.0016 | 0.54 | 0.0015 | 0.0025 | 0 | 0.03 |
| A11 | 0.0019 | 2.84 | 0.61 | 0.04 | 0.0033 | 0.29 | 0.0021 | 0.0023 | 0.05 | 0.02 |
| A12 | 0.0034 | 2.92 | 0.35 | 0.06 | 0.0024 | 0.19 | 0.0015 | 0.0017 | 0.03 | 0.01 |

TABLE 2

| Steel type | Formula 1 | Formula 2 | Formula 3 | Formula 4 | Formula 5 | Iron loss (W/kg) | Magnetic flux density (T) | Remarks |
|---|---|---|---|---|---|---|---|---|
| A1 | 1.03 | 0.20 | 0.41 (112, 96) | 0.38 | 0.30 (40, 133) | 2.36 | 1.73 | Inventive Example |
| A2 | 1.12 | 0.24 | 0.29 (88, 79) | 0.65 | 0.48 (16, 33) | 1.94 | 1.69 | Inventive Example |
| A3 | 1.42 | 0.20 | 0.47 (116, 97) | 1.04 | 0.55 (38, 69) | 2.91 | 1.66 | Comparative Example |
| A4 | 1.79 | 0.66 | 0.61 (84, 66) | 0.87 | 0.22 (14, 64) | 2.76 | 1.65 | Comparative Example |
| A5 | 1.51 | 0.29 | 0.38 (99, 86) | 0.71 | 0.51 (37, 73) | 2.09 | 1.70 | Inventive Example |
| A6 | 1.82 | 0.37 | 0.54 (111, 90) | 0.85 | 0.86 (38, 44) | 2.85 | 1.68 | Comparative Example |
| A7 | 2.06 | 0.24 | 0.57 (105, 84) | 0.88 | 0.14 (16, 114) | 2.42 | 1.69 | Comparative Example |
| A8 | 1.96 | 0.25 | 0.40 (121, 104) | 0.49 | 0.23 (39, 170) | 2.17 | 1.72 | Inventive Example |
| A9 | 0.93 | 0.41 | 0.67 (90, 69) | 0.96 | 0.62 (13, 21) | 2.56 | 1.64 | Comparative Example |
| A10 | 0.96 | 0.30 | 0.35 (99, 87) | 0.57 | 0.28 (39, 139) | 2.26 | 1.71 | Inventive Example |
| A11 | 0.9 | 0.38 | 0.35 (89, 78) | 0.51 | 0.38 (45, 118) | 1.97 | 1.69 | Inventive Example |
| A12 | 0.54 | 0.33 | 0.65 (115, 89) | 0.94 | 0.75 (27, 36) | 2.94 | 1.68 | Comparative Example |

The each value in Table 1 represents weight %.

In Table 2, Formula 1 represents the value of [Al]+[Mn], Formula 2 represents the value of ([Si]+[Al]+[Mn]/2)*([P]+[Sn]+[Sb]), and [Al], [Mn], [Si], [P], [Sn], and [Sb] represent the content (wt %) of Al, Mn, Si, P, Sn, and Sb, respectively.

In Table 2, Formula 3 represents the value of ($Gs_{center}$−$Gs_{surface}$)/($Gs_{center}$*t). In Formula 3, t represents the thickness (mm) of the non-oriented electrical steel sheet, $Gs_{surface}$ represents the average grain size (μm) from 0 to t/4 or from 3t/4 to t based on the thickness direction of the non-oriented steel sheet, and $Gs_{center}$ represents the average grain size (μm) from more than t/4 to less than 3t/4 based on the thickness direction of the non-oriented steel sheet. In Formula 3 of Table 2, the values in parentheses represent $Gs_{center}$ and $Gs_{surface}$ from the left.

In Example 1, t is 0.35 mm, so when the bottom surface of the non-oriented electrical steel sheet has a thickness of 0, the $Gs_{surface}$ represents the average grain size in the area from a bottom surface to a thickness of 0.0875 mm upward or from a thickness of 0.2625 mm to a top surface upward. $Gs_{center}$ represents the average grain size in the area of greater than 0.0875 mm and less than 0.2625 mm of the non-oriented electrical steel sheet.

In Table 2, Equation 4 represents the value of ($V_{\{012\}<121>}$+$V_{\{111\}<112>}$)/($V_{\{001\}<310>}$+$V_{\{139\}<310>}$), and $V_{\{012\}<121>}$, $V_{\{111\}<112>}$, $V_{\{001\}<310>}$, and $V_{\{139\}<310>}$ represent the volume fractions of an aggregation structure of {012}<121>, {111}<112>, {001}<310>, and {139}<310>.

An X-ray pole figure test and an EBSD test were performed as a method to analyze the aggregation structure. After grinding the surface of the sample after the cold-rolled sheet annealing to a portion 3/4t of the thickness, (110), (200), and (211) pole figures are measured by EBSD measurement and an X-ray diffraction analyzer. The grain size was measured by a commonly used method such as the line segment method and the area method.

In Table 2, Formula 5 represents a value of v/s. In Formula 5, v represents an average heating rate (° C./sec) from a starting temperature of 650 to 750° C. to a soaking temperature of the cold rolled sheet, and s represents the soaking time (in seconds) while being maintained at the soaking temperature of the cold-rolled sheet. In Formula 5 of Table 2, the values in parentheses represent v and s from the left.

In Table 2, the iron loss ($W_{15/50}$) is the average loss (W/kg) in the rolling direction and the vertical rolling direction when a magnetic flux density of 1.5 Tesla is induced at a frequency of 50 Hz, and the magnetic flux density ($B_{50}$) is the magnitude (Tesla) of the induced magnetic flux density when a magnetic field of 5000 Nm is induced.

A1, A2, A5, A8, A10, and A11, which are the inventive examples satisfying the range of steel components and Formulas 1, 2, and 5, showed excellent iron loss and magnetic flux density. The grain deviation in the thickness direction was smaller than 0.5, and the effect of improving the aggregation structure was also excellent.

A3 did not satisfy the steel component range, so iron loss and magnetic flux density were not better than the inventive examples, and A4 did not satisfy Formula 2, so iron loss and magnetic flux density were not better than the inventive examples. A6 did not satisfy the steel component range and Formula 5, so the iron loss and magnetic flux density were not better than the inventive examples. Although A7 satisfied Formula 1 and Formula 2, it did not satisfy Formula 5 in the manufacturing process, so the grain deviation in the thickness direction exceeded 0.5.

A9 did not satisfy Formulas 2 and 5, so the iron loss and magnetic flux density were not better than the inventive examples. Since Al2 did not satisfy Formula 1, the iron loss and magnetic flux density were not better than the inventive examples.

Example 2

The purpose of this example is to observe the effect of the component elements, the relationship of content of added components, and the relationship between the average heating rate v (° C./sec) from 700° C. to the soaking temperature and the soaking time s (in seconds) at the soaking temperature during the cold-rolled sheet annealing by preparing a slab composed as shown in Table 3 through vacuum dissolution and changing the amount of Si, Mn, Al, P, Sn, and Sb.

Each slab was heated at 1200° C., hot rolled to a thickness of 2.7 mm, and then spiral-wound. The hot-rolled steel sheet was spiral-wound in the air and the cooled hot-rolled steel sheet was annealed at 1000° C. and pickled, and then the cooled hot-rolled steel sheet was cold rolled to a thickness of 0.50 mm, and finally cold-rolled sheet annealing was performed.

At this time, the target temperature of the cold-rolled sheet annealing was 1020° C., and the average heating rate v (° C./sec) from 700° C. to the soaking temperature and the soaking time s (in seconds) at the soaking temperature of 1020° C. were controlled, respectively, and the effect of v/s change on magnetism was confirmed.

For each sample, the volume fraction of the aggregation structure was measured by EBSD and an X-ray pole figure test, the grain size of the center portion and the surface portion in the sheet thickness direction were measured using the intercept method, and the iron loss ($W_{15150}$) and the magnetic flux density ($B_{50}$) were also measured. The results are shown in Table 4 below.

TABLE 3

| Steel type (wt %) | C | Si | Mn | P | S | Al | N | Ti | Sn | Sb |
|---|---|---|---|---|---|---|---|---|---|---|
| B1 | 0.0021 | 2.97 | 0.19 | 0.03 | 0.0035 | 0.98 | 0.0027 | 0.0035 | 0.02 | 0.01 |
| B2 | 0.001 | 2.75 | 0.05 | 0.03 | 0.0043 | 0.83 | 0.0014 | 0.0017 | 0.02 | 0.05 |
| B3 | 0.0017 | 2.44 | 0.81 | 0.01 | 0.0026 | 0.67 | 0.003 | 0.003 | 0.03 | 0.03 |
| B4 | 0.0018 | 2.69 | 0.67 | 0.06 | 0.0022 | 0.29 | 0.0023 | 0.0008 | 0.06 | 0 |
| B5 | 0.0037 | 3.29 | 0.13 | 0.03 | 0.0027 | 0.83 | 0.0032 | 0.003 | 0.02 | 0 |
| B6 | 0.0036 | 3.33 | 0.64 | 0.03 | 0.0026 | 0.88 | 0.0036 | 0.0017 | 0.04 | 0 |
| B7 | 0.0021 | 1.99 | 0.53 | 0.02 | 0.0013 | 0.44 | 0.0029 | 0.0024 | 0.03 | 0.03 |
| B8 | 0.0036 | 3.01 | 0.68 | 0.02 | 0.0024 | 0.07 | 0.0024 | 0.0009 | 0.05 | 0.05 |
| B9 | 0.0011 | 3.13 | 0.94 | 0.07 | 0.0033 | 0.67 | 0.0031 | 0.0029 | 0 | 0.09 |
| B10 | 0.0018 | 3.25 | 0.35 | 0.03 | 0.0018 | 0.82 | 0.0035 | 0.0028 | 0 | 0.05 |
| B11 | 0.0025 | 2.27 | 0.18 | 0.01 | 0.0015 | 0.49 | 0.0016 | 0.0031 | 0 | 0.02 |
| B12 | 0.0008 | 2.54 | 0.48 | 0.05 | 0.002 | 1.12 | 0.0011 | 0.0014 | 0.03 | 0 |

TABLE 4

| Steel type | Formula 1 | Formula 2 | Formula 3 | Formula 4 | Formula 5 | Iron loss (W/kg) | Magnetic flux density (T) | Remarks |
|---|---|---|---|---|---|---|---|---|
| B1 | 1.17 | 0.24 | 0.39 (107, 86) | 0.68 | 0.54 (25, 46) | 2.25 | 1.71 | Inventive Example |
| B2 | 0.88 | 0.36 | 0.47 (85, 65) | 0.82 | 0.28 (23, 82) | 2.96 | 1.67 | Comparative Example |
| B3 | 1.48 | 0.25 | 0.44 (82, 64) | 0.39 | 0.50 (9, 18) | 2.32 | 1.73 | Inventive Example |
| B4 | 0.96 | 0.40 | 0.36 (101, 83) | 0.57 | 0.26 (36, 138) | 2.49 | 1.72 | Inventive Example |
| B5 | 0.96 | 0.21 | 0.53 (120, 88) | 1.08 | 0.13 (18, 138) | 2.65 | 1.70 | Comparative Example |
| B6 | 1.52 | 0.32 | 0.30 (88, 75) | 0.77 | 0.36 (21, 58) | 2.16 | 1.70 | Inventive Example |
| B7 | 0.97 | 0.22 | 0.43 (97, 76) | 0.48 | 0.25 (49, 196) | 2.61 | 1.74 | Inventive Example |
| B8 | 0.75 | 0.41 | 0.71 (130, 84) | 0.88 | 0.28 (48, 171) | 2.84 | 1.66 | Comparative Example |
| B9 | 1.61 | 0.68 | 0.67 (122, 81) | 0.94 | 0.12 (15, 125) | 2.88 | 1.66 | Comparative Example |
| B10 | 1.17 | 0.34 | 0.36 (99, 81) | 0.75 | 0.37 (30, 81) | 2.09 | 1.70 | Inventive Example |
| B11 | 0.67 | 0.09 | 0.48 (125, 95) | 0.83 | 0.48 (16, 33) | 3.28 | 1.68 | Comparative Example |
| B12 | 1.6 | 0.31 | 0.63 (89, 61) | 0.92 | 0.71 (42, 59) | 2.67 | 1.70 | Comparative Example |

Each value in Table 3 represents weight %.

In Table 4, Formula 1 represents the value of [Al]+[Mn], Formula 2 represents the value of ([Si]+[Al]+[Mn]/2)*([P]+[Sn]+[Sb]), and [Al], [Mn], [Si], [P], [Sn], and [Sb] represents the content (wt %) of Al, Mn, Si, P, Sn, and Sb, respectively.

In Table 4, Formula 3 represents the value of ($Gs_{center}$−$Gs_{surface}$)/($Gs_{center}$*t). In Formula 3, t represents the thickness (mm) of the non-oriented electrical steel sheet, $Gs_{surface}$ represents the average grain size (μm) from 0 to t/4 or from 3t/4 to t based on the thickness direction of the non-oriented steel sheet, and $Gs_{center}$ represents the average grain size (μm) from more than t/4 to less than 3t/4 based on the thickness direction of the non-oriented steel sheet. In Formula 3 of Table 4, the values in parentheses represent $Gs_{center}$ and $Gs_{surface}$ from the left. In Example 2, t is 0.50 mm, so when the bottom surface of the non-oriented electrical steel sheet has a thickness of 0, the $Gs_{surface}$ represents the average grain size in the area from a bottom surface to a thickness of 0.125 mm upward or from a thickness of 0.375 mm to a top surface upward. $Gs_{center}$ represents the average grain size in the area of greater than 0.125 mm and less than 0.375 mm of the non-oriented electrical steel sheet.

In Table 4, Equation 4 represents the value of ($V_{\{012\}<121>}$+$V_{\{111\}<112>}$)/($V_{\{001\}<310>}$+$V_{\{139\}<310>}$), and $V_{\{012\}<121>}$, $V_{\{111\}<112>}$, $V_{\{001\}<310>}$, and $V_{\{139\}<310>}$ represent the volume fractions of an aggregation structure of {012}<121>, {111}<112>, {001}<310>, and {139}<310>.

An X-ray pole figure test and an EBSD test were performed as a method to analyze the aggregation structure. After grinding the surface of the sample after the cold-rolled sheet annealing to a portion of 3/4t of the thickness, (110), (200), and (211) pole figures are measured by EBSD measurement and an X-ray diffraction analyzer. The grain size was measured by a commonly used method such as the line segment method and the area method.

In Table 4, Formula 5 represents a value of v/s. In Formula 5, v represents an average heating rate (° C./sec) from a starting temperature of 650 to 750° C. to a soaking temperature of the cold rolled sheet, and s represents the soaking time (in seconds) that is maintained at the soaking temperature of the cold-rolled sheet. In Formula 5 of Table 4, the values in parentheses represent v and s from the left.

In Table 4, the iron loss ($W_{15150}$) is the average loss (W/kg) in the rolling direction and the vertical rolling direction when a magnetic flux density of 1.5 Tesla is induced at a frequency of 50 Hz, and the magnetic flux density ($B_{50}$) is the magnitude (Tesla) of the induced magnetic flux density when a magnetic field of 5000 A/m is induced.

B1, B3, B4, B6, B7, and B10, which are the inventive examples satisfying the range of steel components and Formulas 1, 2, and 5, showed excellent iron loss and magnetic flux density. The grain deviation in the thickness direction was smaller than 0.5, and the effect of improving the aggregation structure was also excellent.

B2 did not satisfy the steel component range and Formula 1, so iron loss and magnetic flux density were not better than the inventive examples. Although B5 satisfied Formula 1 and Formula 2, it did not satisfy Formula 5 in the manufacturing process, so the grain deviation in the thickness direction exceeded 0.5.

B8 did not satisfy the steel component range and Formulas 1 and 2, so iron loss and magnetic flux density were not better than the inventive examples. B9 did not satisfy Formulas 2 and 5, so the grain deviation in the thickness direction exceeded 0.5 and iron loss and magnetic flux density were not better than the inventive examples. And B11 did not satisfy Formulas 1 and 2, so iron loss and magnetic flux density were not better than the inventive examples.

Although B12 satisfied Formula 1 and Formula 2, it did not satisfy Formula 5 in the manufacturing process, so the grain deviation in the thickness direction exceeded 0.5.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A non-oriented electrical steel sheet comprising 1.5 to 4.0 wt % of Si, 0.1 to 1.5 wt % of Al, 0.1 to 1.5 wt % of Mn, 0.005 wt % or less, excluding 0% of C, 0.005 wt % or less, excluding 0% of N, 0.005 wt % or less, excluding 0% of Ti, 0.001 to 0.005 wt % of S, 0.1 wt % or less, excluding 0% of P, 0.02 to 0.2 wt % of a sum of Sn and Sb, and a balance of Fe and other inevitable impurities,
wherein both Sn and Sb are included together,
wherein the electrical steel sheet satisfies the following Formulas 1, 2, 3, and 4:

$$0.9 \leq [Al]+[Mn] \leq 2.1 \quad \text{[Formula 1]}$$

$$0.2 \leq ([Si]+[Al]+[Mn]/2)*([P]+[Sn]+[Sb]) \leq 0.4 \quad \text{[Formula 2]}$$

$$(Gs_{center}-Gs_{surface})/(Gs_{center}*t) \leq 0.5 \text{ (mm}^{-1}) \quad \text{[Formula 3]}$$

$$0.2 \leq (V_{\{012\}<121>}+V_{\{111\}<112>})/(V_{\{001\}<310>}+V_{\{139\}<310>}) \leq 0.8 \quad \text{[Formula 4]}$$

in Formula 1 and Formula 2, [Al], [Mn], [Si], [P], [Sn], and [Sb] represent the content in weight % of Al, Mn, Si, P, Sn, and Sb, respectively,
in Formula 3, t represents the thickness in mm of the non-oriented electrical steel sheet, $Gs_{surface}$ represents the average grain size in μm from 0 to t/4 or 3t/4 to t based on the thickness direction of the non-oriented steel sheet, and $Gs_{center}$ represents the average grain size in μm from more than t/4 to less than 3t/4 based on the thickness direction of the non-oriented steel sheet, and
in Formula 4, $V_{\{012\}<121>}$, $V_{\{111\}<112>}$, $V_{\{001\}<310>}$, and $V_{\{139\}<310>}$ represent the volume fraction of an aggregation structure having an orientation within 15° at {012}<121>, {111}<112>, {001}<310>, and {139}<310>, respectively.

2. The non-oriented electrical steel sheet of claim 1, wherein
the steel sheet thereof comprises at least one of 0.05 wt % or less, excluding 0% of Cu, 0.05 wt % or less, excluding 0% of Ni, 0.05 wt % or less, excluding 0% of Cr, 0.01 wt % or less, excluding 0% of Zr, 0.01 wt % or less, excluding 0% of Mo, and 0.01 wt % or less, excluding 0% of V.

3. A method for manufacturing a non-oriented electrical steel sheet, comprising:
heating a slab comprising 1.5 to 4.0 wt % of Si, 0.1 to 1.5 wt % of Al, 0.1 to 1.5 wt % of Mn, 0.005 wt % or less, excluding 0% of C, 0.005 wt % or less, excluding 0% of N, 0.005 wt % or less, excluding 0% of Ti, 0.001 to 0.005 wt % of S, 0.1 wt % or less, excluding 0% of P, 0.02 to 0.2 wt % of a sum of Sn and Sb, and a balance of Fe and other inevitable impurities, and satisfying Formula 1 and Formula 2;
producing a hot-rolled sheet by hot rolling the slab;
producing a cold-rolled sheet by cold rolling the hot-rolled sheet; and
performing cold-rolled sheet annealing to satisfy following Formula 5,
wherein both Sn and Sb are included together,
wherein the electrical steel sheet satisfies the following Formulas 4:

$$0.9 \leq [Al]+[Mn] \leq 2.1 \quad \text{[Formula 1]}$$

$$0.2 \leq ([Si]+[Al]+[Mn]/2)*([P]+[Sn]+[Sb]) \leq 0.4 \quad \text{[Formula 2]}$$

$$0.2 \leq (V_{\{012\}<121>}+V_{\{111\}<112>})/(V_{\{001\}<310>}+V_{\{139\}<310>}) \leq 0.8 \quad \text{[Formula 4]}$$

$$0.2 \leq v/s \leq 0.6 \quad \text{[Formula 5]}$$

in Formula 1 and Formula 2, [Al], [Mn], [Si], [P], [Sn], and [Sb] represent the content in weight % of Al, Mn, Si, P, Sn, and Sb, respectively,
in Formula 4, $V_{\{012\}<121>}$, $V_{\{111\}<112>}$, $V_{\{001\}<310>}$, and $V_{\{139\}<310>}$ represent the volume fraction of an aggregation structure having an orientation within 15° at {012}<121>, {111}<112>, {001}<310>, and {139}<310>, respectively, and
in Formula 5, v represents an average heating rate in °C./sec from a starting temperature of 650 to 750° C. to a soaking temperature of the cold rolled sheet, and s represents the soaking time in seconds while being maintained at the soaking temperature of the cold-rolled sheet.

4. The method for manufacturing a non-oriented electrical steel sheet of claim 3, wherein
the slab thereof comprises at least one of 0.05 wt % or less, excluding 0% of Cu, 0.05 wt % or less, excluding 0% of Ni, 0.05 wt % or less, excluding 0% of Cr, 0.01 wt % or less, excluding 0% of Zr, 0.01 wt % or less, excluding 0% of Mo, and 0.01 wt % or less, excluding 0% of V.

5. The method for manufacturing a non-oriented electrical steel sheet of claim 3, wherein
in the performing cold rolled sheet annealing,
the soaking temperature is 850 to 1050° C.

6. The method for manufacturing a non-oriented electrical steel sheet of claim 3, wherein
the method further comprises performing the hot-rolled sheet annealing at 950 to 1150° C., after producing a hot-rolled sheet by hot rolling the slab.

* * * * *